United States Patent [19]
Krikorian et al.

[11] Patent Number: 5,568,394
[45] Date of Patent: Oct. 22, 1996

[54] INTERFEROMETRY WITH MULTIPATH NULLING

[75] Inventors: Kapriel V. Krikorian, Agoura; Robert A. Rosen, Agoura Hills, both of Calif.

[73] Assignee: Hughes Aircraft Company, Los Angeles, Calif.

[21] Appl. No.: 388,947

[22] Filed: Feb. 15, 1995

Related U.S. Application Data

[63] Continuation of Ser. No. 140,953, Oct. 25, 1993, abandoned.

[51] Int. Cl.$^6$ ..................................................... G06F 17/10
[52] U.S. Cl. ........................... 364/487; 356/345; 342/156
[58] Field of Search ..................................... 364/487, 481, 364/550, 553, 573, 571.01, 571.02, 571.04, 574; 356/345; 342/156, 22, 26, 147, 159, 194, 169; 375/99, 100; 73/40.5, 40.4

[56] References Cited

U.S. PATENT DOCUMENTS

| | | | |
|---|---|---|---|
| 3,568,189 | 3/1971 | Poirier | 342/156 |
| 4,172,382 | 10/1979 | Murphy et al. | 73/40.5 |
| 4,422,165 | 12/1983 | Thomas et al. | 364/421 |
| 4,596,024 | 6/1986 | Thomson | 375/100 |
| 4,828,389 | 5/1989 | Gubbins et al. | 356/350 |
| 5,157,461 | 10/1992 | Page | 356/350 |
| 5,262,843 | 11/1993 | Sugarbaker et al. | 356/350 |
| 5,265,121 | 11/1993 | Stewart | 375/99 |

Primary Examiner—Emanuel T. Voeltz
Assistant Examiner—Craig Steven Miller
Attorney, Agent, or Firm—Leonard A. Alkov; W. K. Denson-Low

[57] ABSTRACT

A processing method that processes interferometer data to provide for rejection of multipath signal returns from an emitter and computes an improved estimate of the relative angle between the emitter and an interferometer. The present processing method comprises the following steps. Interferometric data is gathered that comprises complex signal amplitudes derived from the emitter at a plurality of emitter angles relative to the interferometer. The complex signal amplitudes derived at each of the plurality of emitter angles are processed by maximizing a predetermined log likelihood function corresponding to a natural logarithm of a predetermined probability density function at each of the plurality of emitter angles to produce a plurality of maximized log likelihood functions. The improved estimate of relative angle between the emitter and the interferometer is made by selecting the emitter angle corresponding to an optimally maximized log likelihood function. The present method rejects multipath signal returns from an emitter and computes an improved estimate of the angle between the emitter and the interferometer. The present processing method may be employed to reject radome reflections in radars, particularly those employing antennas having a relatively low radar cross-section.

4 Claims, 2 Drawing Sheets

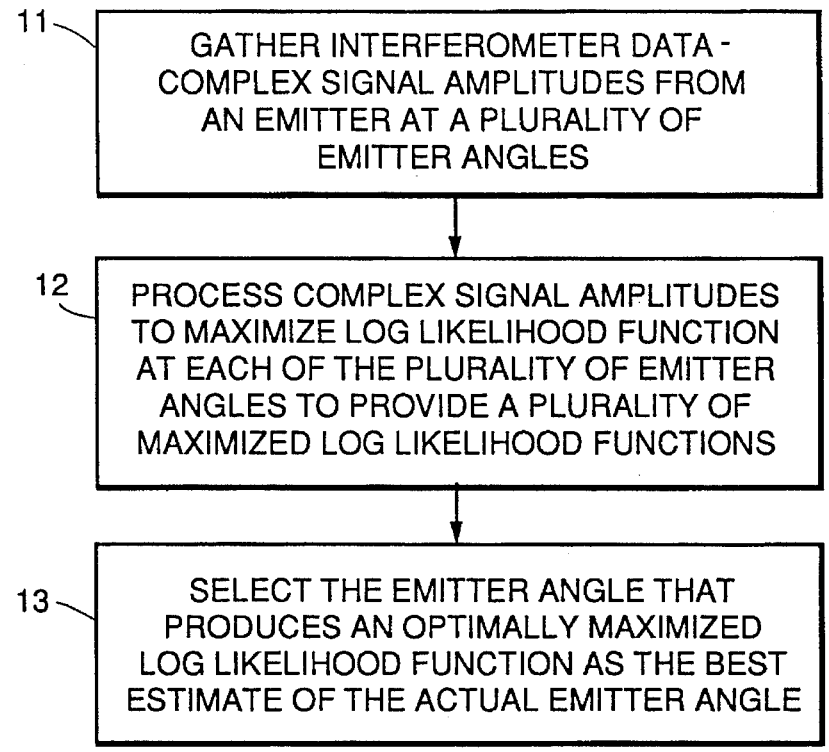
FIG. 1.
FIG. 2.
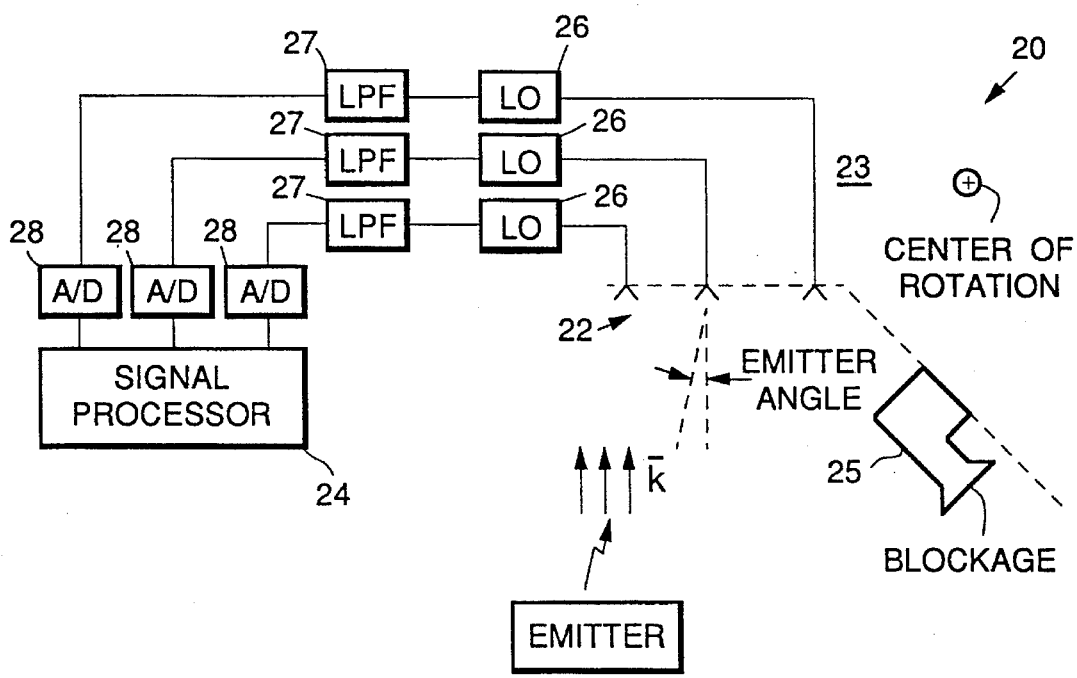

INTERFEROMETRY WITH MULTIPATH NULLING

CROSS REFERENCE TO RELATED APPLICATIONS

This application is a continuation of U.S. patent application Ser. No. 08/140,953, filed Oct. 25, 1993, now abandoned.

BACKGROUND

The present invention relates to interferometry, and more particularly, to a multipath nulling technique for use in processing interferometer data that rejects multipath returns.

In conventional interferometry applications, the presence of ownship multipath reflections (those reflections caused by the vehicle or platform that carries an interferometer or radar) can be detected by the interferometer. Ownship multipath reflections, including signal blockage and reflections, degrade the reliability of the estimate of emitter angle determined by the interferometer. Techniques to detect multipath reflections in interferometer array have been previously developed by the assignee of the present invention. However, no effective technique that provides for multipath rejection and emitter angle estimation in the presence of multipath has heretofore been devised.

Consequently, it is an objective of the invention to provide an effective multipath rejection and emitter angle estimation technique for use in processing data from interferometer arrays.

SUMMARY OF THE INVENTION

In order to meet the above and other objectives, the present invention is a processing method that processes interferometer data to provide for rejection of multipath signal returns from an emitter and computes an improved estimate of the relative angle between the emitter and an interferometer. The present processing method comprises the following steps.

The first step is to gather interferometric data comprising complex signal amplitudes derived from the emitter at a plurality of emitter angles relative to the interferometer. The next step is to process the complex signal amplitudes derived at each of the plurality of emitter angles to maximize a predetermined log likelihood function corresponding to a natural logarithm of a predetermined probability density function at each of the plurality of emitter angles to produce a plurality of maximized log likelihood functions. The final step is to select as the improved estimate of relative angle between the emitter and the interferometer one emitter angle corresponding to an optimally maximized log likelihood function.

The present processing method thus processes interferometer data to reject multipath signal returns from an emitter and compute an improved estimate of the angle between the emitter and the interferometer. The present processing method rejects ownship multipath and provides for more accurate location of emitters. The processing method uses a maximum likelihood function that incorporates multipath statistics so that it is robust against multipath variability. The present processing method may also be adapted to reject radome reflections in radars, particularly those employing antennas having a relatively low radar cross-section.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 is a flow diagram illustrating one embodiment of a processing method in accordance with the principles of the present invention;

FIG. 2 shows a test setup that was used to prove out an implementation of the processing method of FIG. 1;

DETAILED DESCRIPTION

Figure 3:
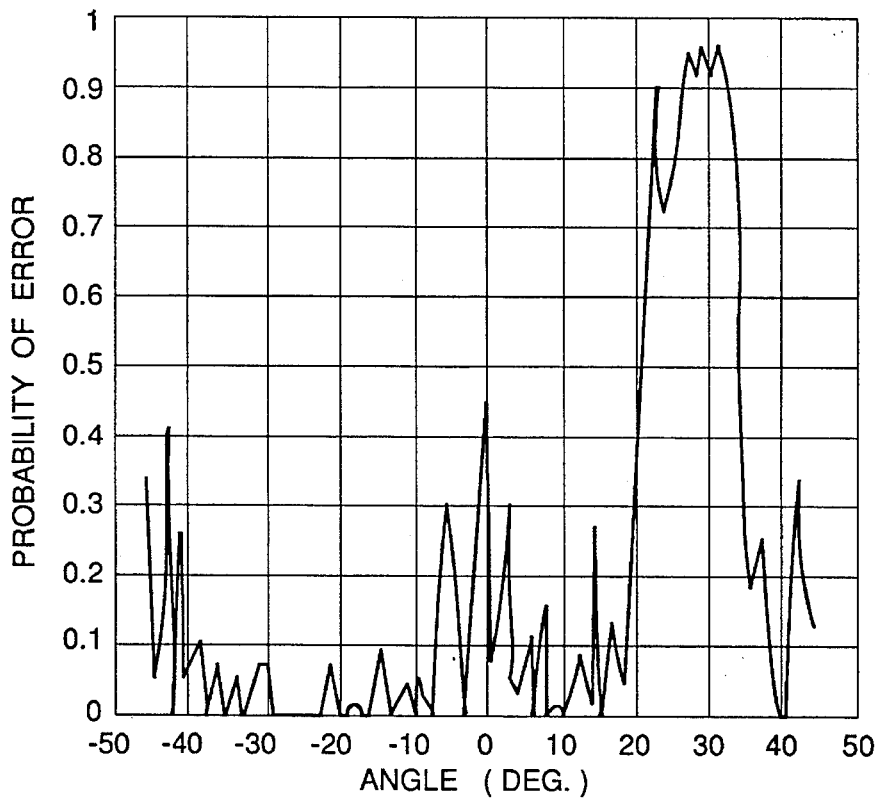
FIG. 3 shows a graph of ambiguity resolving probability of error as a function of angle for an interferometer without the use of the present method.

Referring to the drawing figures, FIG. 1 is a flow diagram illustrating one embodiment of a processing method 10 in accordance with the principles of the present invention. The method 10 will also be described with reference to FIG. 2, which shows an experimental test setup employing an interferometer system 20 that was used to prove out an implementation of the processing method 10. With reference to FIGS. 1 and 2, the processing method 10 comprises the following steps.

The interferometer system 20 is comprised of an interferometer array 22 comprising a plurality of antenna elements, a plurality of local oscillators (LO) 26 disposed along signal paths from each of the antenna elements, a plurality of low pass filters (LPF) 27 coupled to respective outputs of each of the local oscillators 26, a plurality of analog to digital (A/D) converters 28 coupled to respective outputs of each of the local oscillators 26, and a signal processor 24 coupled to respective outputs of the analog to digital (A/D) converters 28

The first step in the present method 10 is to gather interferometric data comprising complex signal amplitudes $\kappa$ derived from an emitter 21 at a plurality of emitter angles relative to the interferometer array 22, as indicated by step 11. The next step is to process the complex signal amplitudes by maximizing a predetermined log likelihood function corresponding to the natural logarithm of a predetermined maximum likelihood function, as indicated by step 12. The predetermined maximum likelihood function is discussed in more detail below. Then, the particular emitter angle that maximizes the log likelihood function is selected as the actual emitter angle, as is provided by step 13.

The processing method 10 of the present invention was tested by simulation. With reference to FIG. 2, data was collected in an anechoic chamber 20 using a three-element interferometer array 22 mounted on a rotatable table 23. Emitter frequencies between 7 and 11 GHz were used. Blockage 25 is disposed at a predetermined angle relative to the interferometer array 22 and is used to create the multipath that will occur when the system 20 is deployed. Data derived from the interferometer array 22 was processed in the signal processor 24 that implemented the present processing method 10. In the tested embodiment of the processing method 10, the maximum likelihood function was derived based on a Rayleigh distribution of the multipath amplitude and a uniformly distributed random phase. The derivation of the maximum likelihood function employed in the processing method 10 is given below.

The probability density, P, of each measured voltage vector $v$ (that defines the emitter angle) derived from the emitter 21 is given by the equation:

$$P = p(v|\alpha)p(\alpha)d^2\alpha$$

where $p(v|\alpha)$ is the conditional density of $v$ given a relative complex amplitude for multipath $\alpha$, and is given by the equation:

$$p(v|\alpha) = 1/\pi e^{-|n|^2},$$

where n is a noise vector given by $n = v - s$; s is a signal vector given by $s = \kappa(\mu + \alpha b)$; $\mu$ is a normalized voltage vector corresponding to a direct path given by the equation $$\mu_i = \frac{1}{\sqrt{N}} e^{-j(2\pi/\lambda)\vec{k}\cdot\vec{d_i}}$$

where N is the number of interferometer elements, $d_i$ is the position of element i, k is a unit vector along the line of sight corresponding to possible emitter angles derived from voltages collected in the first step 11 of the method 10. The vector b is constrained to satisfy $b^+b = 1$ and $\mu^*b = 0$. The complex scalar, $\kappa$, represents an unknown signal amplitude and phase. Therefore ($\mu^+\mu = 1$); b is a normalized voltage vector for multipath orthogonal to the direct path and is given by ($b^+b = 1$, $\mu^+b = 0$); and where $\kappa$ has a complex signal amplitude. Therefore, $$p(v|\alpha) = 1/\pi e^{-[|n'|^2 + |\mu^+n|^2 + |b^+n|^2]}$$

where $$n' = (1 - \mu\mu^+ - bb^+)n = (1 - \mu\mu^{30} - bb^+)v,$$

so, $$p(v|\alpha) = (1/\pi)e^{-[|v|^2 + |\mu^+v|^2 + |b^+v|^2 + |\mu^+v - \kappa|^2 + |b^+v + \kappa\alpha|^2]}.$$

It is assumed that $\alpha$ is complex Gaussian, so the probability density for $\alpha$ is given by:

$$p(\alpha) = (\omega/\pi)e^{-|\omega\alpha|^2},$$

where $\omega$ is the reciprocal of the expectation of relative multipath power $|\alpha|^2$.

In the maximum likelihood processing method 10 of the present invention, the complex signal amplitude $\kappa$ is selected to maximize the probability density P. From the above formula for $p(v|\alpha)$, the maximum occurs when the phase of $\kappa$ matches the phase of $\mu^+v$. Thus, $\kappa = k\mu^+v$, where k is a real constant. Also, defining $r = |\mu^+v|^2$ and
$q = |b^+v|^2$, then the probability density, P, is given by:

$$P = \frac{\omega}{\pi^2} \int e^{-[|v|^2 - r - q + r(1+k)^2 + |\sqrt{q} - k\sqrt{r\alpha}|^2 + \omega|\alpha|^2]} d^2\alpha$$

$$= \frac{\omega}{\pi^2} \int e^{-[|v|^2 - r - q + r(1+k)^2]} \int e^{-[(k^2r+\omega)|\alpha - \frac{k(rq)^{1/2}}{k^2r+\omega}|^2 + q - \frac{k(rq)^{1/2}}{k^2r+\omega}]} d^2\alpha$$

$$= \frac{\omega}{\pi^2} \int e^{-[|v|^2 - r - q + r(1+k)^2]} e^{-\frac{q\omega}{k^2r+\omega}} \int e^{-[(k^2r+\omega)|\alpha|^2]} d^2\alpha$$

$$= \frac{\omega}{\pi(k^2r+\omega)} e^{-[|v|^2 - r - q + r(1-k)^2 + \frac{q\omega}{k^2r+\omega}]}.$$

The log likelihood function, Q, is therefore $$Q \overset{\Delta}{=} \ln P = \ln\left(\frac{\omega}{k^2r+\omega}\right) + r + q - r(1-k)^2 - \frac{q\omega}{k^2r+\omega} - |v|^2 - \ln\pi.$$

At each possible emitter angle chosen from the set of angles at which measurements were performed in the first step 11 of the method 10, the constant k is selected to maximize Q. Then the particular emitter angle that optimally maximizes Q is selected as the actual emitter angle.

Figure 4:
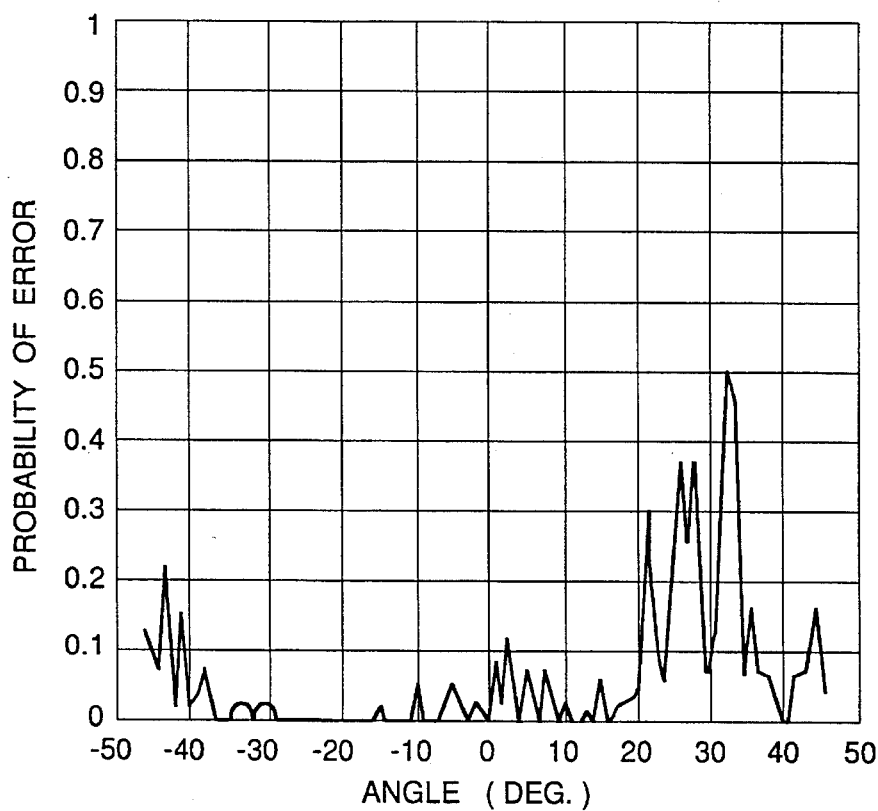
FIG. 4 shows a graph of ambiguity resolving probability of error as a function of angle for an interferometer using the present method to provide constrained noniterative multipath nulling.

FIG. 3 shows a graph of ambiguity resolving probability of error as a function of angle for the tested interferometer array 22 without the use of the processing method of the present invention. For comparative purposes, FIG. 4 shows a graph of ambiguity resolving probability of error as a function of angle for the interferometer using the present invention to provide constrained noniterative multipath nulling. As can be seen by comparing FIGS. 3 and 4, the use of the processing method 10 of the present invention greatly reduces the effects of multipath in accurately determining emitter angle.

The present processing method may also be adapted to reject radome reflections in radars, particularly those employing antennas having a relatively low radar cross-section. In this case, instead of using the multi-element interferometer array 22 (having a plurality of individual elements), multiple antenna apertures are used to null out the multipath caused by the radome. With reference to the drawing figures, the radome corresponds to the blockage 25 in FIG. 2.

Thus there has been described a new and improved multipath nulling technique for use in processing interferometer data that rejects multipath returns. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A method of processing interferometric signals derived from an interferometer to eliminate multipath signals and provide an improved estimate of relative angle between an unknown emitter and the interferometer, said method comprising the steps of:

measuring complex signals using the interferometer that are derived from a known emitter at a plurality of emitter angles relative to the interferometer;

processing the measured complex signals from the plurality of emitter angles to generate corresponding multipath contributions to each of the complex signals by subtracting the signal corresponding to a direct path to the known emitter at each of the plurality of emitter angles from each of the complex signals;

measuring complex signals from the unknown emitter using the interferometer;

processing the measured complex signals from the unknown emitter to maximize a predetermined log likelihood function at the plurality of emitter angles that incorporates statistics of the multipath signals and noise for the unknown emitter; and selecting as the estimate of relative angle between the unknown emitter and the interferometer an emitter angle corresponding to the direct path of one of the plurality of emitter angles that maximizes the log likelihood function for the unknown emitter.

2. The method of claim 1 wherein the predetermined log likelihood function is given by the equation $$Q \stackrel{\Delta}{=} \ln P = \ln\left(\frac{\omega}{k^2 r + \omega}\right) + r + q - r(1-k)^2 - \frac{q\omega}{k^2 r + \omega} - |v|^2 - \ln \pi,$$

where $\omega$ is the reciprocal of the expectation of relative multipath signal power; k is a constant selected to maximize Q; $r = |\mu^+ v|^2$ and $q = |b^+ v|^2$; v is the measured voltage vector relative to the receiver noise root mean square voltage from the unknown emitter; $\mu$ is a voltage vector corresponding to a possible direct path from the unknown emitter to the interferometer normalized by $\mu^+\mu = 1$; and b is a voltage vector for the multipath normalized by $b^+b = 1$ and satisfying orthogonality to the direct path, $\mu^+ b = 0$.

3. A method of determining an improved estimate of relative direction to an unknown emitter having an unknown location in the presence of multipath interference, said method comprising the steps of:

providing an interferometer;

measuring direct path and multipath amplitude and phase signals using the interferometer that are derived from a known emitter at a plurality of known angles relative to the interferometer;

measuring amplitude and phase signals derived from the unknown emitter using the interferometer;

processing the measured amplitude and phase signals to maximize a predetermined log likelihood function at each of the plurality of emitter angles to produce a plurality of predetermined maximized log likelihood functions that are indicative of a direct path to the known emitter at each of the plurality of emitter angles; and outputting as an estimate of the relative direction to the unknown emitter the direct path corresponding to the maximum of the maximized predetermined log likelihood functions.

4. The method of claim 3 wherein the predetermined log likelihood function is given by the equation $$Q \stackrel{\Delta}{=} \ln P = \ln\left(\frac{\omega}{k^2 r + \omega}\right) + r + q - r(1-k)^2 - \frac{q\omega}{k^2 r + \omega} - |v|^2 - \ln \pi,$$

where $\omega$ is the reciprocal of the expectation of relative multipath signal power; k is a constant selected to maximize Q; $r = |\mu^+ v|^2$ and $q = |b^+ v|^2$; v is the measured voltage vector relative to the receiver noise root mean square voltage from the unknown emitter; $\mu$ is a voltage vector corresponding to a possible direct path from the unknown emitter to the interferometer normalized by $\mu^+\mu = 1$; and b is a voltage vector for the multipath normalized by $b^+b = 1$ and satisfying orthogonality to the direct path, $\mu^+ b = 0$.

\* \* \* \* \*